United States Patent
Wu et al.

(10) Patent No.: US 11,618,169 B2
(45) Date of Patent: Apr. 4, 2023

(54) COMPUTING DEVICE AND METHOD FOR DETERMINING COORDINATES OF MECHANICAL ARM

(71) Applicant: Chiun Mai Communication Systems, Inc., New Taipei (TW)

(72) Inventors: Chung-Wei Wu, New Taipei (TW); Tung-Chun Hsieh, New Taipei (TW); Chih-Wei Li, New Taipei (TW); Sung-Chuan Lee, New Taipei (TW); Tze-Chin Lo, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 207 days.

(21) Appl. No.: 17/091,345

(22) Filed: Nov. 6, 2020

(65) Prior Publication Data

US 2021/0129343 A1 May 6, 2021

(30) Foreign Application Priority Data

Nov. 6, 2019 (CN) .......................... 201911078444.6

(51) Int. Cl.
*B25J 9/16* (2006.01)
(52) U.S. Cl.
CPC .......... *B25J 9/1697* (2013.01); *B25J 9/1661* (2013.01)

(58) Field of Classification Search
CPC ...... B25J 9/1697; B25J 9/1661; B25J 9/1602; B25J 9/1664; G05B 2219/37097
See application file for complete search history.

(56) References Cited

U.S. PATENT DOCUMENTS

| 2016/0059419 A1* | 3/2016 | Suzuki | B25J 9/1692 901/14 |
| 2018/0272537 A1* | 9/2018 | Ishigaki | G06T 7/74 |

* cited by examiner

*Primary Examiner* — Abby Y Lin
*Assistant Examiner* — Dylan Brandon Mooney
(74) *Attorney, Agent, or Firm* — ScienBiziP, P.C.

(57) ABSTRACT

A method for determining coordinates of a mechanical arm includes taking a first picture of a marker on a target object on a first jig, obtaining first position coordinates of the marker, calculating reference position coordinates, controlling the mechanical arm to move to the reference position coordinates, moving the mechanical arm from the reference position coordinates to an intermediate position, setting current position coordinates as intermediate position coordinates, moving the mechanical arm from the intermediate position to a target position, setting current position coordinates as target position coordinates, moving the target object onto a second jig, taking a second picture of the marker to obtain second position coordinates, calculating reference position coordinates based on the second position coordinates, controlling the mechanical arm to move to the reference position coordinates, calculating intermediate position coordinates corresponding to the second jig, and calculating target position coordinates corresponding to the second jig.

10 Claims, 6 Drawing Sheets

COMPUTING DEVICE AND METHOD FOR DETERMINING COORDINATES OF MECHANICAL ARM

FIELD

The subject matter herein generally relates to the field of mechanical control, and more particularly to a computing device and a method for determining coordinates of a mechanical arm.

BACKGROUND

When mechanical arms are used to implement automated production, the mechanical arms are usually controlled based on multiple absolute coordinates, such as reference position coordinates, intermediate position coordinates, and target position coordinates. The mechanical arm my be controlled to move from the reference position coordinates to the intermediate position coordinates, and then to the target position coordinates to perform grabbing and placing operations. However, the absolute coordinates are usually extracted by manual operation. Therefore, the time to manually search for each of the absolute coordinates in a plurality of workstations is long and affects production efficiency.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
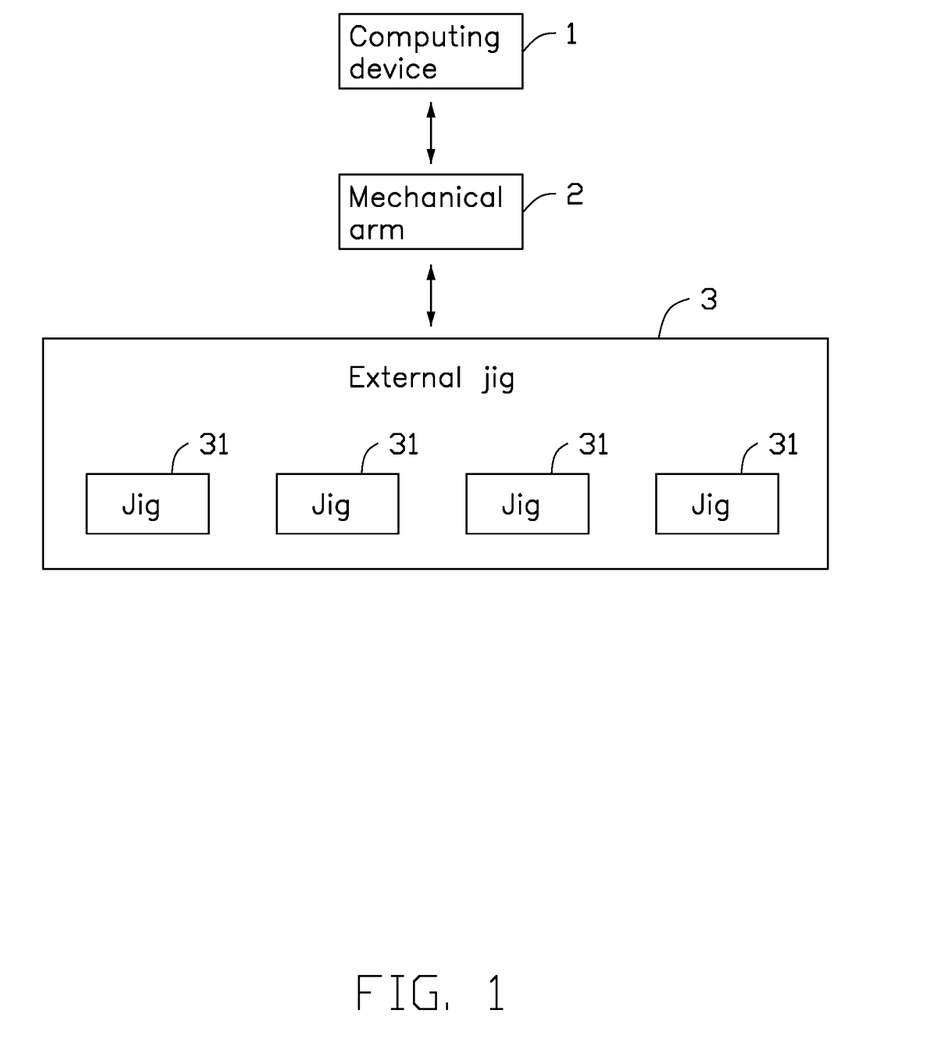
FIG. 1 is an application environment diagram of an embodiment of a method for determining coordinates of a mechanical arm.

FIG. 1 shows an application environment diagram of an embodiment of a method for determining coordinates of a mechanical arm.

In one embodiment, the application environment includes a computing device 1, a mechanical arm 2, and a plurality of jigs 31.

In one embodiment, the plurality of jigs 31 is arranged in an array. The plurality of jigs 31 may be included in one external jig 3. In other embodiments, the plurality of jigs 31 is not included in the external jig 3. In one embodiment, both the external jig 3 and the jig 31 refer to a model tool that assists in controlling position or movement (or both).

In one embodiment, the computing device 1 establishes a wireless communication connection with the mechanical arm 2. For example, the computing device 1 may establish a communication connection with the mechanical arm 2 through a wireless router.

Figure 2:
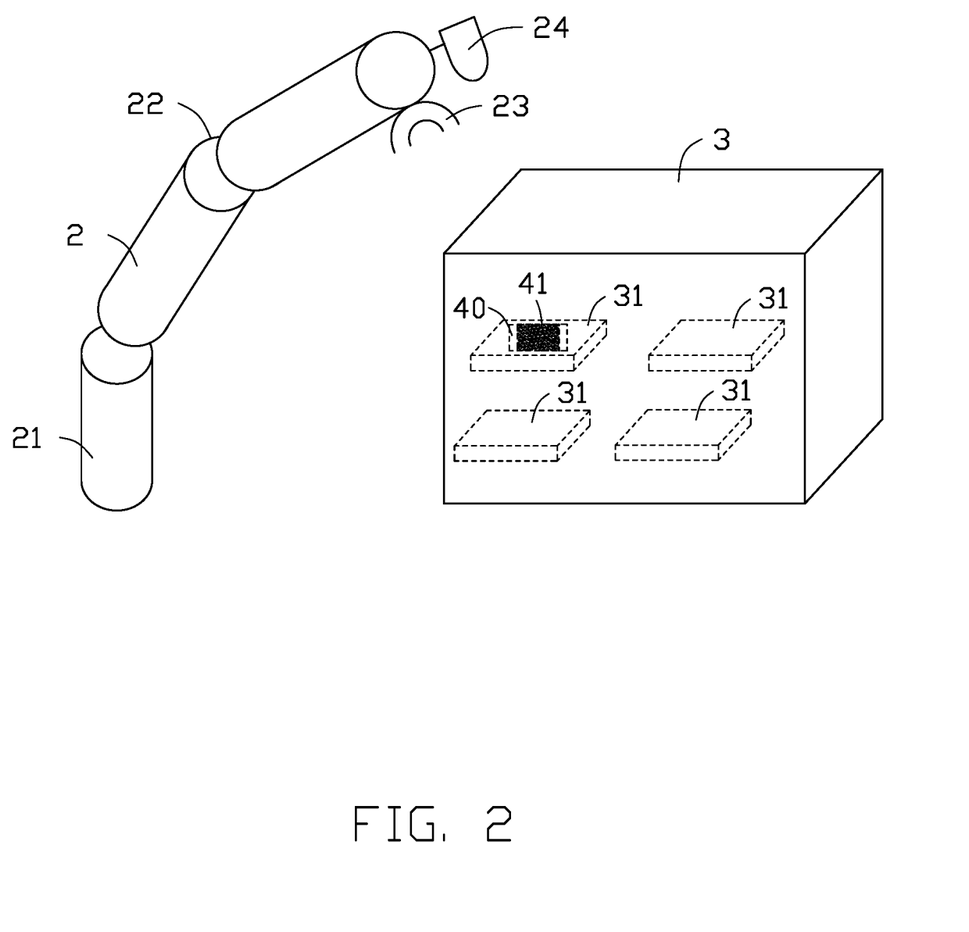
FIG. 2 is a schematic diagram of a mechanical arm and a plurality of jigs.

Referring to FIG. 2, in one embodiment, the mechanical arm 2 includes a base 21, an arm portion 22, a clamp 23, and a camera 24. The camera 24 is located adjacent to the clamp 23. The arm portion 22 is coupled to the base 21, and the clamp 23 is provided at a front end of the arm portion 22. In one embodiment, when a target object 40 is placed on one of the jigs 31, the computing device 1 controls the camera 22 to aim at the jig 31 where the target object 40 is placed to take pictures. In one embodiment, a marker 41 is provided on the target object 40. For example, the marker 41 can be pasted onto the target object 40. The marker 41 may be an ArUco marker. Thus, when the computing device 1 obtains a picture of the target object 40 provided with the marker 41, the computing device 1 obtains position coordinates of the marker 41. The position coordinates of the marker 41 are also coordinates of the marker in a three-dimensional coordinate system where the mechanical arm 2 is located.

It should be noted that the ArUco marker is a binary square marker, which consists of a wide black border and an internal binary matrix. The internal binary matrix determines an ID. A size of the ArUco markers determines a size of the internal binary matrix. For example, a 4*4 ArUco marker consists of 16 bits.

Specifically, the computing device 1 may use the OpenCV function library (ArUco Libary) to obtain position coordinates of the marker 41 based on the picture of the marker 41. It should be noted that ArUco Libary was developed by the Ava Group of the University of Cordoba (Spain).

In one embodiment, the target object 40 may be an object that the mechanical arm 2 needs to take from the jig 31 or place onto the jig 31. The target object 40 can be any product. In one embodiment, the target object 40 is a motherboard.

In one embodiment, the three-dimensional coordinate system where the mechanical arm 2 is located may be based on the base 21 as an origin, a horizontal plane where the base 21 is located as an XY plane, and a vertical axis perpendicular to the XY plane as a Z axis.

Figure 3:
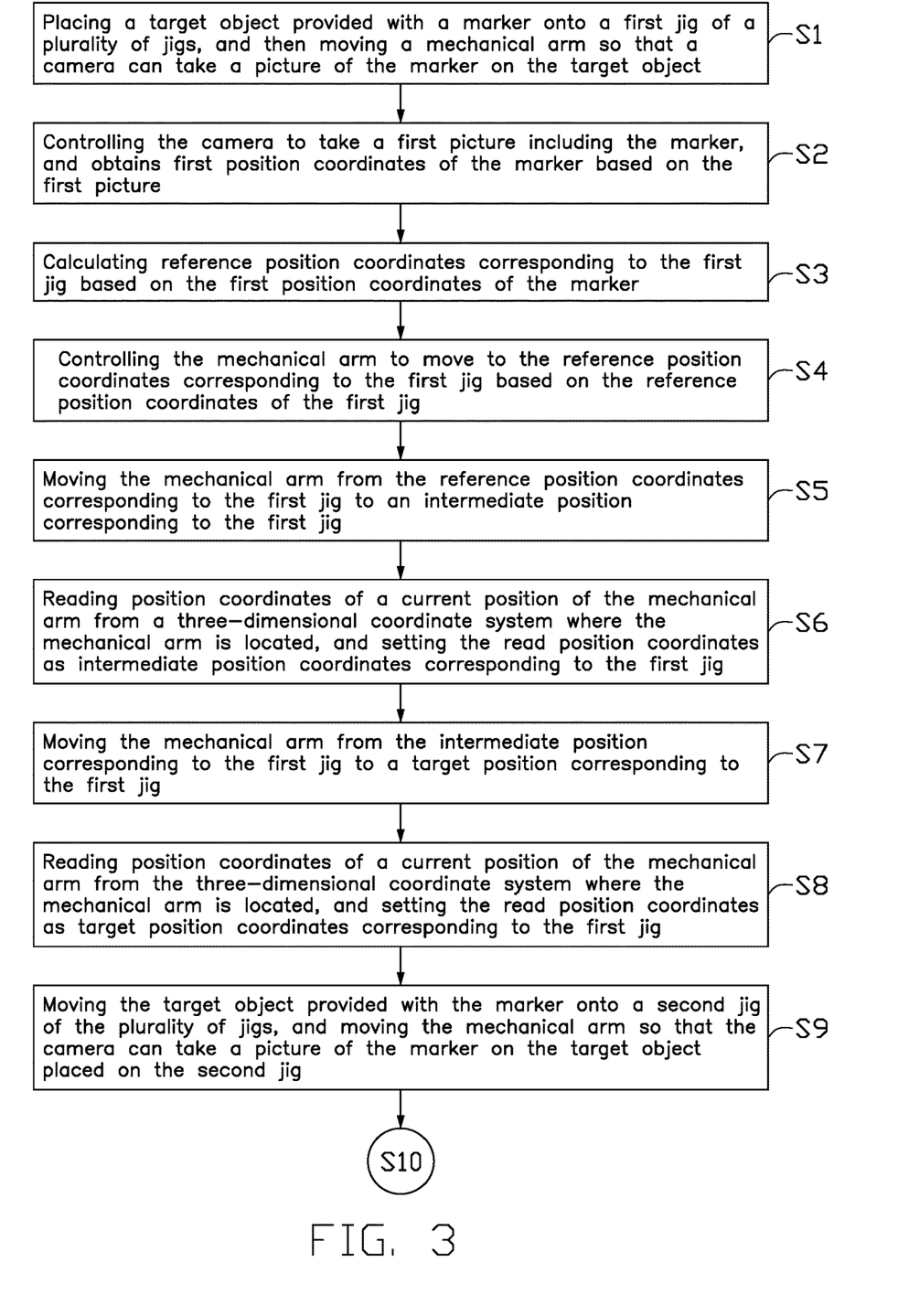
FIGS. 3 and 4 are a flowchart of an embodiment of a method for determining coordinates of a mechanical arm.
Figure 4:
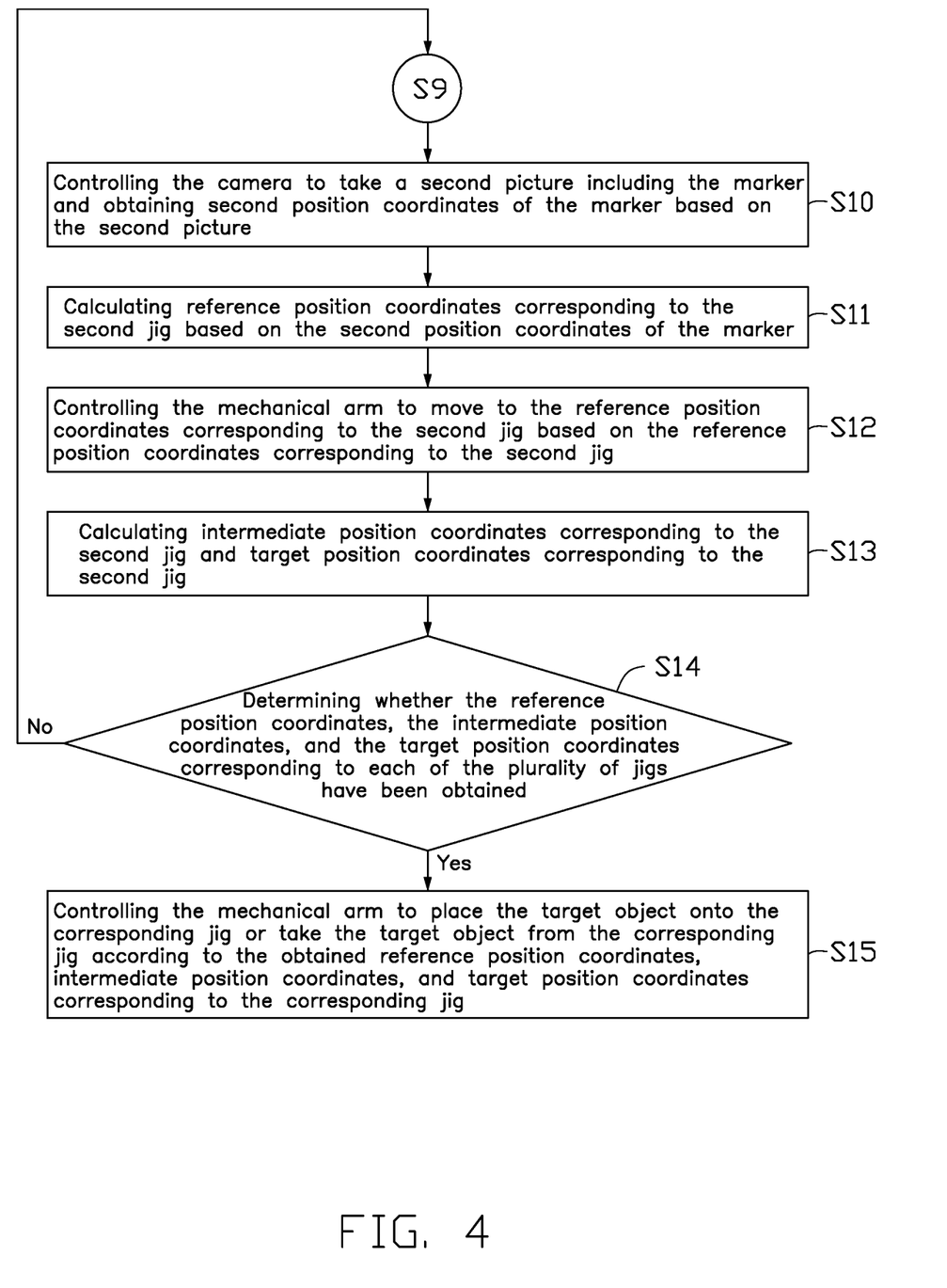

FIG. 3 and FIG. 4 are flowcharts of an embodiment of a method for determining coordinates of a mechanical arm.

In one embodiment, the method for determining the coordinates of the mechanical arm are applied to the computing device 1. Functions for determining the coordinates of the mechanical arm can be directly integrated into the computing device 1, or can be run on the computing device 1 in the form of a software development kit (SDK).

As shown in FIGS. 3 and 4, the method for determining the coordinates of the mechanical arm specifically includes the following blocks. According to different requirements, the order of the blocks in the flowcharts can be changed, and some blocks can be omitted or combined.

At block 51, the target object 40 provided with the marker 41 is placed onto a first jig 31 of the plurality of jigs 31, and then the mechanical arm 2 is moved so that the camera 24 can take a picture of the marker 41 on the target object 40.

In one embodiment, the target object 40 is manually placed onto the first jig 31, and the mechanical arm 2 is manually moved so that the camera 24 can take a picture of the marker 41 on the target object 40.

In one embodiment, the mechanical arm 2 is moved so that the camera 24 can take pictures of each of the plurality of jigs 31.

At block S2, the computing device 1 controls the camera 24 to take a first picture including the marker 41, and obtains first position coordinates of the marker 41 based on the first picture.

As mentioned above, the marker 41 can be the ArUco markers, so that the computing device 1 can obtain the first position coordinates of the marker 41 based on the first picture by using the OpenCV function library (ArUco Library). The first position coordinates of the marker 41 are also the position coordinates of the marker 41 in the three-dimensional coordinate system where the mechanical arm 2 is located.

At block S3, the computing device 1 calculates reference position coordinates corresponding to the first jig 31 based on the first position coordinates of the marker 41.

It should be noted that the reference position coordinates corresponding to any one jig 31 of the plurality of jigs 31 are the coordinates that the mechanical arm 2 must pass through in order to place the target object 40 onto the any one jig 31 or take the target object 40 from the any one jig 31.

Taking the first position coordinates of the marker 41 as $(X_{m1}, Y_{m1}, Z_{m1})$ as an example, the reference position coordinates corresponding to the first jig 31 may be $(X_{m1}, Y_{m1}, Z_{m1+d})$. That is, an abscissa coordinate and an ordinate coordinate of the reference position coordinates corresponding to the first jig 31 are the same as an abscissa coordinate and an ordinate coordinate of the first position coordinates of the marker 41, and a vertical coordinate of the reference position coordinates is equal to a vertical coordinate of the first position coordinates of the marker 41 plus a preset value d.

In one embodiment, the value of d is an empirical value. For example, d is equal to 30 cm, 25 cm, or other values. The value of d can be preset according to an operating environment and operating experience. In one embodiment, d is equal to 30 cm.

At block S4, the computing device 1 controls the mechanical arm 2 to move to the reference position coordinates corresponding to the first jig 31 based on the reference position coordinates of the first jig 31.

At block S5, the mechanical arm 2 is moved from the reference position coordinates corresponding to the first jig 31 to an intermediate position corresponding to the first jig 31.

In one embodiment, the mechanical arm 2 is manually moved from the reference position coordinates to the intermediate position.

The intermediate position corresponding to any jig 31 is different from the reference position coordinates corresponding to the jig 31. The intermediate position corresponding to any jig 31 is defined as a position point that the mechanical arm 2 needs to pass through in order to place the target object 40 onto the jig 31 or take the target object 40 from the jig 31. The intermediate position is between the reference position coordinates and a target position.

In one embodiment, the intermediate position corresponding to the first jig 31 is directly below the reference position coordinates corresponding to the first jig 31, and a distance between the intermediate position corresponding to the first jig 31 and the reference position coordinates of the first jig 31 is a preset value, such as 20 cm.

At block S6, the computing device 1 reads position coordinates of a current position of the mechanical arm 2 (the intermediate position corresponding to the first jig 31) from the three-dimensional coordinate system where the mechanical arm 2 is located, and sets the read position coordinates as intermediate position coordinates corresponding to the first jig 31.

At block S7, the mechanical arm 2 is moved from the intermediate position corresponding to the first jig 31 to the target position corresponding to the first jig 31.

In one embodiment, the mechanical arm 2 is manually moved from the intermediate position to the target position.

It should be noted that the target position corresponding to any one jig 31 of the plurality of jigs 31 is defined as a position where the mechanical arm 2 grasps the target object 40 on the any one jig 31 or releases the target object 40 onto the any one jig 31.

At block S8, the computing device 1 reads position coordinates of a current position of the mechanical arm 2 (the target position corresponding to the first jig 31) from the three-dimensional coordinate system where the mechanical arm 2 is located, and sets the read position coordinates as target position coordinates corresponding to the first jig 31, so that the computing device 1 obtains the reference position coordinates corresponding to the first jig 31, the intermediate position coordinates corresponding to the first jig 31, and the target position coordinates of the first jig 31.

At block S9, the target object 40 provided with the marker 41 is moved onto a second jig 31 of the plurality of jigs 31, and the mechanical arm 2 is moved so that the camera 24 takes a picture of the marker 41 on the target object 40 placed on the second jig 31.

In one embodiment, the target object 40 is manually placed onto the second jig 31, and the mechanical arm 2 is manually moved so that the camera 24 can take a picture of the target object 40 on the second jig 31.

At block S10, the computing device 1 controls the camera 24 to take a second picture including the marker 41 and obtains second position coordinates of the marker 41 based on the second picture.

Similarly, the computing device 1 can use the OpenCV function library (ArUco Library) to obtain the second position coordinates of the marker 41 based on the second picture of the marker 41. The second position coordinates of the marker 41 are the coordinates of the marker 41 in the three-dimensional coordinate system where the mechanical arm 2 is located.

At block S11, the computing device 1 calculates reference position coordinates corresponding to the second jig 31 based on the second position coordinates of the marker 41.

Taking the second position coordinates of the marker 41 as $(X_{m2}, Y_{m2}, Z_{m2})$ as an example, the reference position coordinates corresponding to the second jig 31 may be $(X_{m2}, Y_{m2}, Z_{m2+d})$. That is, an abscissa coordinate and an ordinate coordinate of the reference position coordinates corresponding to the second jig 31 are the same as an abscissa coordinate and an ordinate coordinate of the second position coordinates of the marker 41, and a vertical coordinate of the reference position coordinates is equal to a vertical coordinate of the second position coordinates of the marker 41 plus a preset value d.

In one embodiment, the value of d is an empirical value. For example, d is equal to 30 cm, 25 cm, or other values. The value of d can be preset according to an operating environment and operating experience. In one embodiment, d is equal to 30 cm.

At block S12, the computing device 1 controls the mechanical arm 2 to move to the reference position coordinates corresponding to the second jig 31 based on the reference position coordinates corresponding to the second jig 31.

At block S13, the computing device 1 calculates intermediate position coordinates corresponding to the second jig 31 and target position coordinates corresponding to the second jig 31.

The computing device 1 calculates the intermediate position coordinates corresponding to the second jig 31 based on the reference position coordinates corresponding to the second jig 31 and a relative relationship between the intermediate position coordinates corresponding to the first jig 31 and the reference position coordinates corresponding to the first jig 31. The computing device 1 calculates the target position coordinates corresponding to the second jig 31 based on the reference position coordinates corresponding to the second jig 31 and a relative relationship between the target position coordinates corresponding to the first jig 31 and the reference position coordinates corresponding to the first jig 31.

Specifically, reference position coordinates p0 corresponding to the first jig 31 are (X0, Y0, Z0), intermediate position coordinates p1 corresponding to the first jig 31 are (X1, Y1, Z1), target position coordinates p2 corresponding to the first jig 31 are (X2, Y2, Z2), reference position coordinates p0' corresponding to the second jig 31 are (X0', Y0', Z0'), intermediate position coordinates p1' corresponding to the second jig 31 are (X1', Y1', Z1'), wherein X1'=X0'+(X1−X0), Y1'=Y0', Z1'=Z0', and target position coordinates p2' corresponding to the second jig 31 are (X2', Y2', Z2'), wherein X2'=X0'+(X2−X0), Y2'=Y0', Z2'=Z0'.

For example, suppose p0 (X0, Y0, Z0) is (1, 0, 0), p1 (X1, Y1, Z1) is (3, 0, 0), p2 (X2, Y2, Z2) is (6, 0, 0), and p0' (X0', Y0', Z0') is (4, 5, 6), then it is calculated that X1'=6, X2'=9, and then p1' can be calculated as (6, 5, 6), and p2' can be calculated as (9, 5, 6).

At block S14, the computing device 1 determines whether the reference position coordinates, the intermediate position coordinates, and the target position coordinates corresponding to each of the plurality of jigs 31 have been obtained.

If the reference position coordinates, the intermediate position coordinates, and the target position coordinates corresponding to the each of the plurality of jigs 31 have not been obtained, blocks S9-S13 are implemented again for each of the rest of the plurality of jigs 31 in sequence until the reference position coordinates, the intermediate position coordinates, and the target position coordinates of each of the plurality of jigs 31 is obtained.

In one embodiment, if the reference position coordinates, the intermediate position coordinates, and the target position coordinates of each of the plurality of jigs 31 has not been obtained, the method may be ended or may further include block S15.

At block S15, the computing device 1 controls the mechanical arm 2 to place the target object 40 onto the corresponding jig 31 or take the target object 40 from the corresponding jig 31 according to the obtained reference position coordinates, intermediate position coordinates, and target position coordinates corresponding to the corresponding jig 31.

For example, suppose that a jig F has reference position coordinates p0' (4, 5, 6), intermediate position coordinates p1' (6, 5, 6), and target position coordinates p2' (9, 5, 6). When it is necessary to control the mechanical arm 2 to take a target object T from the jig F, the mechanical arm 2 is first controlled to move to the reference position coordinates p0' (4, 5, 6). Then, the mechanical arm 2 is controlled to move from the reference position coordinates p0' (4, 5, 6) to the intermediate position coordinates p1' (6, 5, 6). Finally, the mechanical arm 2 is controlled to move from the intermediate position coordinates p1' (6, 5, 6) to the target position coordinates p2' (9, 5, 6). At the target position coordinates, the mechanical arm 2 is controlled to perform a grasping operation to grab the target object 40 on the jig 31.

According to the above descriptions, only the reference position coordinates, the intermediate position coordinates, and the target position coordinates of one jig 31 and the reference position coordinates of another jig 31 need to be obtained. Then, the intermediate position coordinates and the target position coordinates of the other jig 31 can be calculated. Thus, there is no need to modify the existing jigs and environment, and automation of controlling the mechanical arm 2 is improved.

The above-mentioned FIG. 3 and FIG. 4 describe the method for determining the coordinates of the mechanical arm in detail. In conjunction with FIG. 5 and FIG. 6, functional modules of a software device and hardware device architecture for implementing the method for determining the coordinates of the mechanical arm are respectively described.

Figure 5:
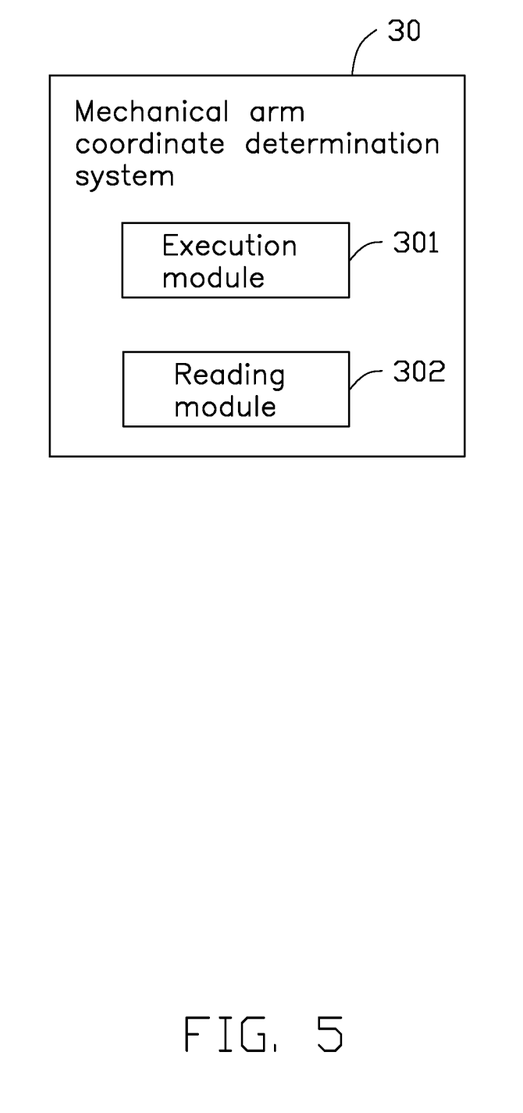
FIG. 5 is a schematic block diagram of function modules of a mechanical arm coordinate determination system.

FIG. 5 shows a functional block diagram of an embodiment of a mechanical arm coordinate determination system 30.

In some embodiments, the mechanical arm coordinate determination system 30 runs in the computing device. The mechanical arm coordinate determination system 30 may include multiple functional modules composed of program code segments. The program code segments in the mechanical arm coordinate determination system 30 can be stored in a memory of the computing device 1 and executed by at least one processor of the computing device 1 to realize functions of the mechanical arm coordinate determination system 30.

In one embodiment, the mechanical arm coordinate determination system 30 includes an execution module 301 and a reading module 302.

The execution module 301 controls the camera 24 to take the first picture including the marker 41, and obtains the first position coordinates of the marker 41 based on the first picture.

As mentioned above, the marker 41 can be ArUco Markers. Therefore, the execution module 301 can use the OpenCV function library (ArUco Libray) to obtain the first position coordinates of the marker 41 based on the first picture of the marker 41. The first position coordinates of the marker 41 are the coordinates of the marker 41 in the three-dimensional coordinate system where the mechanical arm 2 is located.

The execution module 301 calculates the reference position coordinates corresponding to the first jig 31 based on the first position coordinates of the marker 41.

The execution module 301 further controls the mechanical arm 2 to move to the reference position coordinates corresponding to the first jig 31.

After the mechanical arm 2 is moved to the intermediate position, the reading module 302 reads the intermediate position coordinates of the mechanical arm 2 from the three-dimensional coordinate system where the mechanical arm 2 is located.

After the mechanical arm 2 is moved to the target position, the reading module 302 further reads the target position coordinates of the mechanical arm 2 from the three-dimensional coordinate system where the mechanical arm 2 is located.

After the target object 40 provided with the marker 41 is moved from the first jig 31 to the second jig 31 and the mechanical arm 2 is moved so that the camera 24 can take a picture of the marker 41 of the target object 40 on the second jig 31, the execution module 301 controls the camera 24 to take the second picture including the marker 41, and the second position coordinates of the marker 41 based on the second picture are obtained.

The execution module 301 calculates the reference position coordinates corresponding to the second jig 31 based on the second position coordinates of the marker 41.

The execution module 301 further controls the mechanical arm 2 to move to the reference position coordinates corresponding to the second jig 31. Then, the execution module 301 calculates the intermediate position coordinates corresponding to the second jig 31 and the target position coordinates corresponding to the second jig 31.

The execution module 301 determines whether the reference position coordinates, the intermediate position coordinates, and the target position coordinates corresponding to each of the plurality of jigs 31 have been obtained. If the reference position coordinates, the intermediate position coordinates, and the target position coordinates corresponding to each of the plurality of jigs 31 have not been obtained, the execution module 301 and the reading module 302 obtain the reference position coordinates, the intermediate position coordinates, and the target position coordinates corresponding to each of the plurality of jigs 31 as described above.

The execution module 302 further controls the mechanical arm 2 to place the target object 40 onto the corresponding jig 31 or take the target object 40 from the corresponding jig 31.

Figure 6:
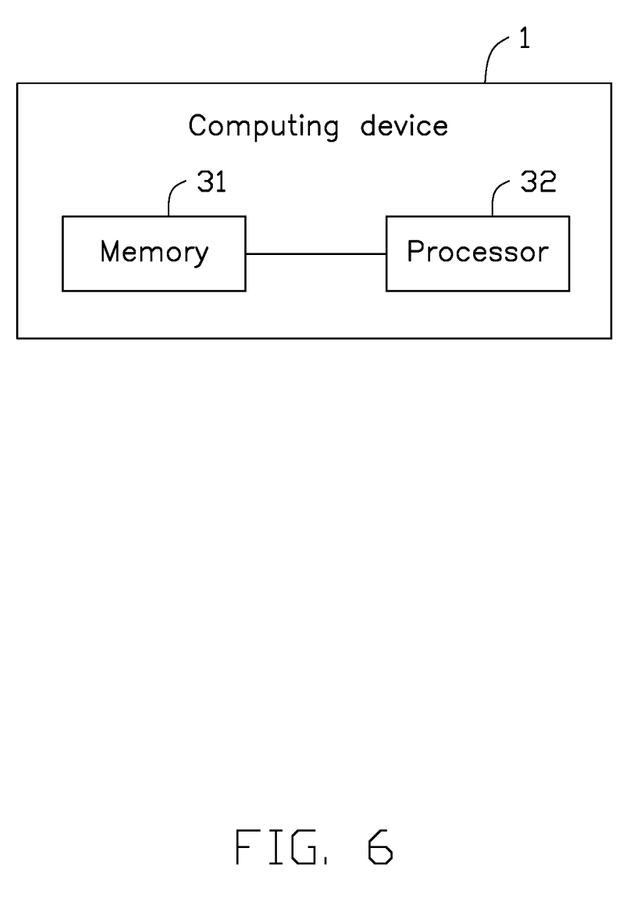
FIG. 6 is a schematic block diagram of a computing device.

FIG. 6 shows a schematic structural diagram of an embodiment of the computing device 1.

In one embodiment, the computing device 1 includes a memory 31 and at least one processor 32 electrically coupled to the memory 31.

Those skilled in the art should understand that the structure of the computing device 1 shown in FIG. 6 does not constitute a limitation of the embodiment of the present disclosure. The computing device 1 may also include more or less hardware or software than shown in FIG. 6, or have different component arrangements. For example, the computing device 1 may also include components such as a display screen.

In some embodiments, the computing device 1 includes a terminal that can automatically perform numerical calculation and/or information processing in accordance with preset or stored instructions. Hardware of the computing device 1 includes, but is not limited to, a microprocessor, an application specific integrated circuit, programmable gate arrays, digital processors, embedded devices, etc.

It should be noted that the computing device 1 is only an example, and other existing or future electronic products that can be adapted to the present disclosure should also be included in the scope of protection of the present disclosure and included here by reference.

In some embodiments, the memory 31 may be used to store program codes and various data of a computer program. For example, the memory 31 may be used to store the mechanical arm coordinate determination system 30 installed in the computing device 1 and realize high-speed and automatic access to programs or data during the operation of the computing device 1. The memory 31 may include a read-only memory, a programmable read-only memory, an erasable programmable read-only memory, a one-time programmable read-only memory, an electronically-erasable programmable read-only memory, a compact disk read-only memory, or other optical disk storage, magnetic disk storage, tape storage, or any other computer-readable storage medium that can be used to carry or store data.

In some embodiments, the at least one processor 32 may be composed of an integrated circuit. For example, the processor 32 can be composed of a single packaged integrated circuit, or it can be composed of multiple integrated circuits with the same function or different functions, including one or more central processing units, microprocessors, digital processing chips, graphics processors, and various control chips. The at least one processor 32 is a control unit of the computing device 1, which uses various interfaces and lines to connect the various components of the entire computing device 1, and runs or executes programs or modules stored in the memory 31 and calls data stored in the memory 31 to execute various functions of the computing device 1 and process data.

Although not shown, the computing device 1 may also include a power source (such as a battery) for supplying power to various components. The power source may be logically coupled to the at least one processor 32 through a power management device, so as to realize charging, discharging, and power management. The power supply may also include one or more DC or AC power supplies, recharging devices, power failure detection circuits, power converters or inverters, power supply status indicators, and other components. The computing device 1 may also include various sensors, BLUETOOTH modules, WIFI modules, etc., which will not be repeated here.

It should be understood that the described embodiments are for illustrative purposes only, and are not limited by this structure in the scope of the patent application.

In a further embodiment, with reference to FIG. 5, the at least one processor 32 can execute various installed applications of the computing device 1, such as the mechanical arm coordinate determination system 30.

Specifically, the method for the at least one processor 32 to execute the above-mentioned multiple instructions to determine the coordinates of the mechanical arm is shown in conjunction with FIG. 3 and FIG. 4, which will not be repeated here.

The modules described as separate components may or may not be physically separated, and the components displayed as modules may or may not be physical units, that is, they may be located in one place, or they may be distributed on multiple network units. Some or all of the modules may be selected according to actual needs to achieve the objectives of the solutions of the embodiments.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A method for determining coordinates of a mechanical arm applied to a computing device, the method comprising:
   placing a target object provided with a marker onto a first jig of a plurality of jigs;
   controlling a camera of the mechanical arm to take a first picture comprising the marker, and obtaining first position coordinates of the marker based on the first picture;
   calculating reference position coordinates corresponding to the first jig based on the first position coordinates of the marker;
   controlling the mechanical arm to move to the reference position coordinates corresponding to the first jig based on the reference position coordinates of the first jig;
   moving the mechanical arm from the reference position coordinates corresponding to the first jig to an intermediate position corresponding to the first jig;
   reading position coordinates of a current position of the mechanical arm from a three-dimensional coordinate system where the mechanical arm is located, and setting the read position coordinates as intermediate position coordinates corresponding to the first jig;
   moving the mechanical arm from the intermediate position corresponding to the first jig to a target position corresponding to the first jig;
   reading position coordinates of a current position of the mechanical arm from the three-dimensional coordinate system where the mechanical arm is located, and setting the read position coordinates as target position coordinates corresponding to the first jig;
   moving the target object provided with the marker onto a second jig of the plurality of jigs;
   controlling the camera to take a second picture comprising the marker and obtaining second position coordinates of the marker based on the second picture;
   calculating reference position coordinates corresponding to the second jig based on the second position coordinates of the marker;
   controlling the mechanical arm to move to the reference position coordinates corresponding to the second jig based on the reference position coordinates corresponding to the second jig;
   calculating intermediate position coordinates corresponding to the second jig;
   calculating target position coordinates corresponding to the second jig;
   determining whether the reference position coordinates, the intermediate position coordinates, and the target position coordinates corresponding to each of the plurality of jigs have been obtained;
   controlling the mechanical arm to place the target object onto the corresponding jig or take the target object from the corresponding jig according to the obtained reference position coordinates, intermediate position coordinates, and target position coordinates corresponding to the corresponding jig; and
   if the reference position coordinates, the intermediate position coordinates, and the target position coordinates corresponding to each of the plurality of jigs have not been obtained, obtaining the reference position coordinates, the intermediate position coordinates, and the target position coordinates corresponding to each of the plurality of jigs.

2. The method of claim 1, wherein:
the intermediate position coordinates corresponding to the second jig are calculated based on the reference position coordinates corresponding to the second jig and a relative relationship between the intermediate position coordinates corresponding to the first jig and the reference position coordinates corresponding to the first jig.

3. The method of claim 2, wherein:
the target position coordinates corresponding to the second jig are calculated based on the reference position coordinates corresponding to the second jig and a relative relationship between the target position coordinates corresponding to the first jig and the reference position coordinates corresponding to the first jig.

4. The method of claim 1, wherein:
an abscissa coordinate and an ordinate coordinate of the reference position coordinates corresponding to the first jig are the same as an abscissa coordinate and an ordinate coordinate of the first position coordinates of the marker, respectively, and a vertical coordinate of the reference position coordinates is equal to a vertical coordinate of the first position coordinates of the marker plus a preset value.

5. The method of claim 1, wherein:
the reference position coordinates corresponding to the first jig are p0 (X0, Y0, Z0), the intermediate position coordinates corresponding to the first jig are p1 (X1, Y1, Z1), the target position coordinates corresponding to the first jig are p2 (X2, Y2, Z2), the reference position coordinates corresponding to the second jig are p0' (X0', Y0', Z0'), the intermediate position coordinates corresponding to the second jig are p1' (X1', Y1', Z1'), and the target position coordinates corresponding to the second jig are p2' (X2', Y2', Z2');

$X1'=X0'+(X1-X0);$ $Y1'=Y0';$ $Z1'=Z0';$ $X2'=X0'+(X2-X0);$ $Y2=Y0'$; and $Z2'=Z0'$.

6. A computing device comprising:

a processor; and a memory storing a plurality of instructions, which when executed by the processor cause the processor to:

control a camera of a mechanical arm to take a first picture comprising a marker and obtain first position coordinates of the marker based on the first picture, the marker located on a target object, and the target object placed onto a first jig of a plurality of jigs;

calculate reference position coordinates corresponding to the first jig based on the first position coordinates of the marker;

control the mechanical arm to move to the reference position coordinates corresponding to the first jig based on the reference position coordinates corresponding to the first jig;

when the mechanical arm is moved from the reference position coordinates corresponding to the first jig to an intermediate position corresponding to the first jig, read position coordinates of a current position of the mechanical arm from a three-dimensional coordinate system where the mechanical arm is located, and set the read position coordinates as intermediate position coordinates corresponding to the first jig;

when the mechanical arm is moved from the intermediate position coordinates corresponding to the first jig to a target position corresponding to the first jig, read position coordinates of a current position of the mechanical arm from the three-dimensional coordinate system where the mechanical arm is located, and set the read position coordinates as target position coordinates corresponding to the first jig;

when the target object provided with the marker is moved onto a second jig of the plurality of jigs, control the camera to take a second picture comprising the marker and obtaining second position coordinates of the marker based on the second picture;

calculate reference position coordinates corresponding to the second jig based on the second position coordinates of the marker;

control the mechanical arm to move to the reference position coordinates corresponding to the second jig based on the reference position coordinates corresponding to the second jig;

calculate intermediate position coordinates corresponding to the second jig based on the reference position coordinates corresponding to the second jig and a relative relationship between the intermediate position coordinates corresponding to the first jig and the reference position coordinates corresponding to the first jig;

calculate target position coordinates corresponding to the second jig based on the reference position coordinates corresponding to the second jig and a relative relationship between the target position coordinates corresponding to the first jig and the reference position coordinates corresponding to the first jig; and control the mechanical arm to place the target object onto the corresponding jig or take the target object from the corresponding jig according to the obtained reference position coordinates, intermediate position coordinates, and target position coordinates corresponding to the corresponding jig.

7. The computing device of claim 6, wherein:

the processor calculates the intermediate position coordinates corresponding to the second jig based on the reference position coordinates corresponding to the second jig and a relative relationship between the intermediate position coordinates corresponding to the first jig and the reference position coordinates corresponding to the first jig.

8. The computing device of claim 7, wherein:

the processor calculates the target position coordinates corresponding to the second jig based on the reference position coordinates corresponding to the second jig and a relative relationship between the target position coordinates corresponding to the first jig and the reference position coordinates corresponding to the first jig.

9. The computing device of claim 6, wherein:

an abscissa coordinate and an ordinate coordinate of the reference position coordinates corresponding to the first jig are the same as an abscissa coordinate and an ordinate coordinate of the first position coordinates of the marker, respectively, and a vertical coordinate of the reference position coordinates is equal to a vertical coordinate of the first position coordinates of the marker plus a preset value.

10. The computing device of claim 6, wherein:

the reference position coordinates corresponding to the first jig are p0 (X0, Y0, Z0), the intermediate position coordinates corresponding to the first jig are p1 (X1, Y1, Z1), the target position coordinates corresponding to the first jig are p2 (X2, Y2, Z2), the reference position coordinates corresponding to the second jig are p0' (X0', Y0', Z0'), the intermediate position coordinates corresponding to the second jig are p1' (X1', Y1', Z1'), and the target position coordinates corresponding to the second jig are p2' (X2', Y2', Z2');

$X1'=X0'+(X1-X0)$;

$Y1'=Y0'$;

$Z1'=Z0'$;

$X2'=X0'+(X2-X0)$;

$Y2=Y0'$; and $Z2'=Z0'$.

* * * * *